(12) United States Patent
Jonsson et al.

(10) Patent No.: US 9,793,945 B2
(45) Date of Patent: Oct. 17, 2017

(54) DETERMINATION OF CHANNEL CONDITION INDICATION

(71) Applicant: Telefonaktiebolaget LM Ericsson (publ), Stockholm (SE)

(72) Inventors: Elias Jonsson, Malmö (SE); Göran Bergman, Lund (SE); Vijaykumar Kuppusamy, Bangalore (IN); Yoshitaka Murata, Tokyo (JP)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/315,306

(22) PCT Filed: Jun. 3, 2014

(86) PCT No.: PCT/EP2014/061506
§ 371 (c)(1),
(2) Date: Nov. 30, 2016

(87) PCT Pub. No.: WO2015/185117
PCT Pub. Date: Dec. 10, 2015

(65) Prior Publication Data
US 2017/0195973 A1    Jul. 6, 2017

(51) Int. Cl.
*H04B 7/00*   (2006.01)
*H04B 1/7103*   (2011.01)
*H04B 1/10*   (2006.01)

(52) U.S. Cl.
CPC ......... *H04B 1/7103* (2013.01); *H04B 1/1027* (2013.01)

(58) Field of Classification Search
CPC ......... H04B 1/707; H04B 2201/70702; H04B 2201/7071; H04J 11/005; H04L 2025/03726

(Continued)

(56) References Cited

U.S. PATENT DOCUMENTS 6,215,827 B1 * 4/2001 Balachandran ....... H04L 1/0003
375/262
9,119,082 B1 * 8/2015 Gomadam ............... H04B 1/28
(Continued)

OTHER PUBLICATIONS

Li, Xiaowen, "A Effective SINR Link to System Mapping Method for CQI Feedback in TD-LTE System", 2011 IEEE 2nd International Conference on Computing, Control and Industrial Engineering (CCIE), Aug. 20-21, 2011, 208-211.

*Primary Examiner* — Tan H Trinh
(74) *Attorney, Agent, or Firm* — Murphy, Bilak & Homiller, PLLC

(57) ABSTRACT

A method is provided of a wireless communication device operating in connection with a cellular communication system providing a serving cell and one or more interfering cells. A signal is received comprising symbols of the serving cell transmitted in a downlink channel and symbols of the one or more interfering cells and a first function of a signal-to-interference ratio of the received signal is calculated. One or more of the interfering cells are selected as dominant interfering cells based on a respective average power of reference symbols of the one or more interfering cells in the received signal, an average power of demodulated symbols of the serving cell in the received signal and a respective average power of demodulated symbols of each of the dominant interfering cells in the received signal are determined. A metric value is calculated based on the average power of demodulated symbols of the serving cell and on the respective average power of demodulated symbols of each of the dominant interfering cells, a channel condition indication is determined based on the metric value and the first function of the signal-to-interference ratio of the received signal, and the channel condition indication is transmitted to the cellular communication system, thereby providing downlink channel condition information to a (Continued)

network node. A method of creating a look-up table for mapping the first function and the metric value to the channel condition indication is also disclosed along with computer program products, arrangements and wireless communication devices corresponding to the methods.

11 Claims, 2 Drawing Sheets

(58) Field of Classification Search
USPC ..... 455/522, 464, 9, 570, 115.2, 114.2, 135, 455/222, 226.3, 422.1, 502; 370/329, 370/342, 252; 375/346, 340, 227
See application file for complete search history.

(56) References Cited

U.S. PATENT DOCUMENTS

| | | | |
|---|---|---|---|
| 2002/0044614 A1* | 4/2002 | Molnar | H04B 1/0003 375/346 |
| 2003/0118131 A1* | 6/2003 | Kobylinski | H04L 25/0204 375/341 |
| 2004/0093178 A1 | 5/2004 | Shin et al. | |
| 2006/0205396 A1* | 9/2006 | Laroia | H04L 1/0015 455/422.1 |
| 2008/0260012 A1* | 10/2008 | Majonen | H04B 1/1027 375/227 |
| 2010/0309861 A1* | 12/2010 | Gorokhov | H04B 1/7103 370/329 |
| 2011/0032837 A1* | 2/2011 | Luschi | H04B 17/318 370/252 |
| 2011/0170440 A1* | 7/2011 | Gaal | H04W 72/082 370/252 |
| 2012/0257568 A1 | 10/2012 | Cai et al. | |
| 2012/0300765 A1* | 11/2012 | Luschi | H04B 1/707 370/342 |
| 2013/0128820 A1 | 5/2013 | Yuan et al. | |
| 2013/0202063 A1* | 8/2013 | Reial | H04B 1/7107 375/340 |
| 2013/0272436 A1 | 10/2013 | Makhlouf et al. | |
| 2014/0029448 A1 | 1/2014 | Balachandran et al. | |
| 2015/0092705 A1* | 4/2015 | Somasundaram | H04B 1/1027 370/329 |
| 2015/0117327 A1* | 4/2015 | Nordstrom | H04W 72/082 370/329 |
| 2015/0156670 A1* | 6/2015 | Jonsson | H04W 28/048 455/502 |
| 2015/0372779 A1* | 12/2015 | Lim | H04J 11/005 370/338 |
| 2016/0135194 A1* | 5/2016 | Kim | H04L 5/0057 370/329 |
| 2016/0197693 A1* | 7/2016 | Nammi | H04J 11/005 370/328 |

* cited by examiner

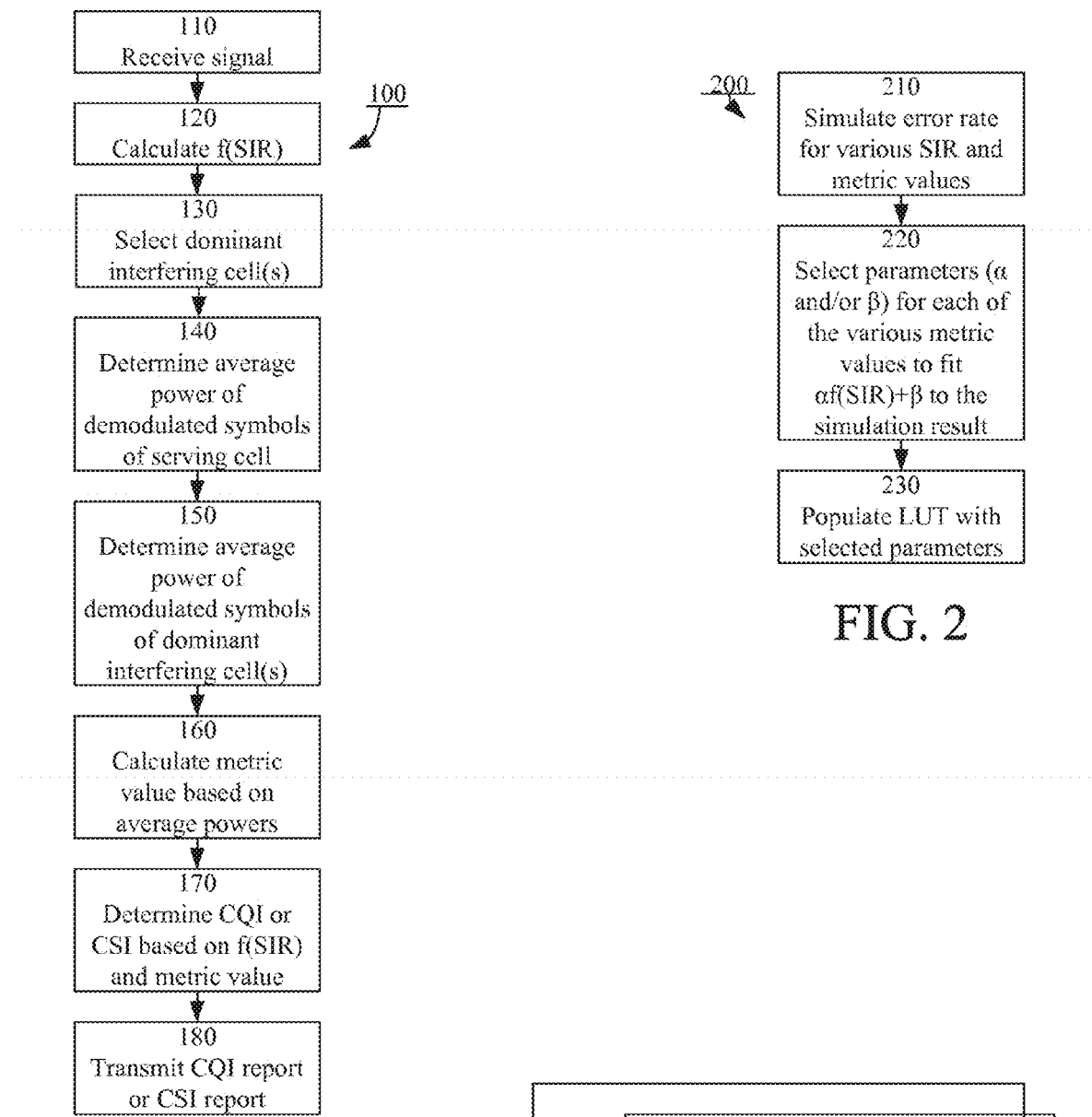
FIG. 1
FIG. 2
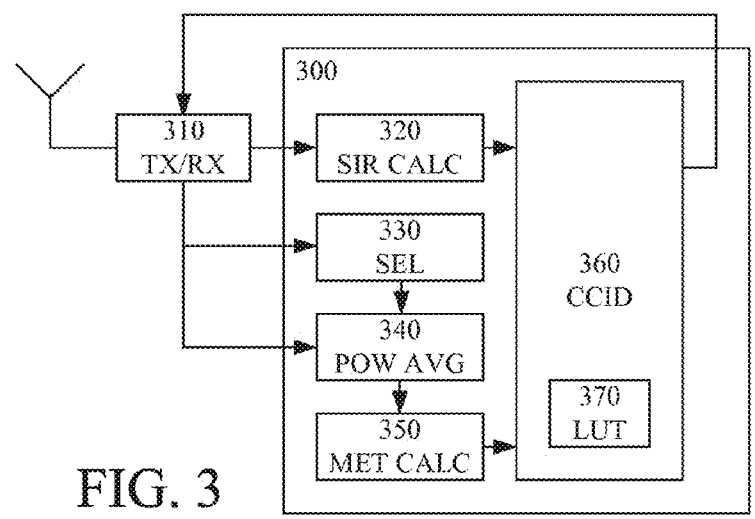
FIG. 3

DETERMINATION OF CHANNEL CONDITION INDICATION

TECHNICAL FIELD

The present invention relates to determination of downlink channel condition indications for feedback to a cellular communication network.

BACKGROUND

In some typical wireless communication systems, wireless communication device (e.g. a mobile device) monitors the downlink channel condition and feeds back a corresponding report to the network providing wireless communication system. The report may, typically, comprise a value indicative of a quantized version of the downlink channel condition.

Examples of such reported values include the channel quality indicator (CQI) for High-Speed Downlink Packet Access (HSDPA) applied in the Wideband Code Division Multiple Access (WCDMA) system specified in relation to UTRAN (Universal Telecommunication Radio Access Network) by 3GPP (Third Generation Partnership Project), and the channel state information (CSI) applied in UMTS-LTE (Universal Mobile Telecommunication Standard, Long Term Evolution) also specified in relation to UTRAN (evolved UTRAN).

Typically, the reported value is used by a network node, such as a base station or NodeB or eNodeB (evolved NodeB) in UTRAN terminology, of the network to select which transport format to use for downlink transmissions. Selecting the transport format may comprise varying one or more of the following parameters: transport block size, coding rate, and modulation format. In many systems, the base station does not necessarily have to select the transport format corresponding to the reported value.

According to currently available 3GPP specifications, the wireless communication device shall select and report the value (CQI or CSI as applicable) such that the block error rate (BLER) corresponding to the reported value does not exceed 0.1 (10%) in a static environment.

Generally, it is of high importance that the wireless communication device reports a value (CQI or CSI as applicable) as close to the optimal value (in terms of BLER) as possible to maximize the data throughput. If the wireless communication device reports a higher value than justified by the channel conditions, a higher than targeted block error rate may be the result. On the other hand, if the wireless communication device reports a lower value than justified by the channel conditions, a lower than possible throughput may be the result.

Channel condition indication reporting, of course, matters less if the base station uses its own method to make BLER of the wireless communication device converge to a target value. However, if the convergence method used by the base station is suboptimal, a good channel condition indication mapping may provide improvements. Even if the convergence method used by the base station is well-designed, the reaction time to changes in the environment is typically slow due to the round-trip time between base station and wireless communication device. Hence, during the transient time before a new equilibrium is found by the convergence method of the base station a good channel condition indication mapping may be of benefit. This effect may also useful in scenarios with a large amount of wireless communication devices served by the same base station where each device gets limited time to let the base station convergence method find an equilibrium.

In HSDPA, the CQI value may be determined based on a measured (and typically averaged) Signal-to-Interference Ratio of the Common Pilot CHannel (CPICH SIR). Mapping CPICH (or any other suitable) SIR to CQI is usually done by a SIR-to-CQI mapping table where each entry may be determined by, for example, the mapping function CQI=floor($\alpha$SIR+$\beta$), where $\alpha$ and $\beta$ are semi-static values. Typically, SIR is represented by a floating point value and CQI is an integer value between 0 and 15. In this typical case, $\alpha$ and $\beta$ function to fit the floating point SIR value to the fixed point CQI scale. More generally, the parameter $\alpha$ corresponds to a slope of the SIR-to-CQI mapping function and the parameter $\beta$ corresponds to an offset of the SIR-to-CQI mapping function.

In UMTS-LTE, the CSI value may, for example, be determined by first determining the mutual information (MI) as MI=ln($\gamma_1$SIR+$\gamma_2$). The mutual information for each resource block may be added together—$\Sigma$MI—across a number of resource blocks (wherein the number may be signaled by the network). Then the CSI value may be determined as CSI=floor($\gamma_3 \Sigma$MI+$\gamma_4$), where the parameters $\gamma_3$ and $\gamma_4$ can be the same as $\alpha$ and $\beta$ respectively, or $\gamma_1$ and $\gamma_2$ respectively, or different parameters.

In the following description, the HSDPA parameters $\alpha$ and $\beta$ will be used as examples even though embodiments may be equally applicable to the UMTS-LTE parameters (e.g. $\gamma_1$ and $\gamma_2$, and/or $\gamma_3$ and $\gamma_4$).

The parameters $\alpha$ and $\beta$ may be static or semi-static, and may have different values depending on a number of factors, for example, one or more of:
  if SIR is above or below a threshold,
  a propagation channel dispersion,
  a Doppler spread of the channel,
  the number of receiver (Rx) antennas of the wireless communication device.

US 2012/0257568 A1 discloses a method for uplink feedback, where a CQI may be calculated for coordinated dynamic network scheduling. In one embodiment, a ratio of the CPICH signal power for the dominant interfering cell to the CPICH power is mapped to the CQI values.

There is a need for alternative methods of determining channel condition indicators. For example, methods with low calculation complexity would be desirable. Furthermore, methods that model the BLER more accurately in various interference and/or cancellation scenarios would be of benefit.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof.

It is an object of some embodiments to obviate at least some of the above disadvantages and to provide alternative methods (and corresponding arrangements, wireless communication devices and computer program products) for determining channel condition indicators.

According to a first aspect, this is achieved by a method performed in a wireless communication device operating in connection with a cellular communication system providing a serving cell operated by a network node of the cellular communication system and one or more interfering cells.

The method comprises receiving a signal comprising symbols of the serving cell transmitted in a downlink channel and symbols of the one or more interfering cells and calculating a first function of a signal-to-interference ratio of the received signal.

The method also comprises selecting one or more of the interfering cells as dominant interfering cells based on a respective average power of reference symbols of the one or more interfering cells in the received signal, determining an average power of demodulated symbols of the serving cell in the received signal, and determining a respective average power of demodulated symbols of each of the dominant interfering cells in the received signal.

The method further comprises calculating a metric value based on the average power of demodulated symbols of the serving cell and on the respective average power of demodulated symbols of each of the dominant interfering cells, determining a channel condition indication based on the metric value and the first function of the signal-to-interference ratio of the received signal, and transmitting the channel condition indication to the network node, thereby providing downlink channel condition information to a network node.

The channel condition indication may, for example, be a channel quality indicator (CQI) value or a channel state information (CSI) value.

The first function of the signal-to-interference ratio may, for example, be one of an average signal-to-interference ratio and a mutual information.

Selecting one or more of the interfering cells as dominant interfering cells may, for example, comprise selecting the cells(s) with highest average power of reference symbols among the one or more interfering cells. The reference symbols may, for example, comprise CPICH symbols and/or CRS (Common Reference Signal) symbols. The average power may, for example, comprise a Received Signal Code Power (RSCP) or a Reference Signal Received Power (RSRP).

The demodulated symbols may, according to some embodiments, be received symbols after demodulation and before decoding. The demodulated symbols may, for example, comprise soft symbols.

Using the demodulated symbols of each of the dominant interfering cells typically implies that the type of demodulator (e.g. equalizer) used by an interference canceller is accounted for in the determination of the channel condition indication. Thus, in some embodiments, determining a channel condition indication may be further based on a type of equalizer used by the wireless communication device.

The determination of the channel condition indication may comprise using a look-up table or an equation to map the metric value and the first function of the signal-to-interference ratio of the received signal to a channel condition indication value.

In some embodiments, the metric may be calculated as a ratio of the average power of demodulated symbols of the serving cell to a sum of the respective average powers of demodulated symbols of each of the dominant interfering cells. This ratio may be expressed as an own cell geometry factor according to some embodiments.

Determining a channel condition indication may, according to some embodiments (e.g. when the channel condition indication is a CQI value), comprise calculating an integer part of a sum of a scaling factor multiplied by the first function of the signal-to-interference ratio of the received signal and an offset factor, wherein at least one of the scaling factor and the offset factor depends on the metric value. The integer part may be defined as a floor function, the scaling factor may be denoted by $\alpha$ and the offset factor may be denoted by $\beta$.

Determining a channel condition indication may, according to some embodiments (e.g. when the channel condition indication is a CSI value), comprise calculating a sum over a plurality of resource blocks of an integer part of a logarithm of a sum of a scaling factor multiplied by the first function of the signal-to-interference ratio of the received signal and an offset factor, wherein at least one of the scaling factor and the offset factor depends on the metric value. The integer part may be defined as a floor function, the scaling factor may be denoted by $\gamma_1$ and the offset factor may be denoted by $\gamma_2$.

A second aspect is a method of creating a look-up table for mapping a first function of a signal-to-interference ratio and a metric value to a channel condition indication. The table is intended for use in a wireless communication device operating in connection with a cellular communication system providing a serving cell operated by a network node of the cellular communication system and one or more interfering cells.

The first function of the signal-to-interference ratio is of a signal received by the wireless communication device and comprising symbols of the serving cell transmitted in a downlink channel and symbols of the one or more interfering cells.

The metric value is calculated based on an average power of demodulated symbols, in the received signal, of the serving cell and on respective average power of demodulated symbols, in the received signal, of each of one or more dominant interfering cells, wherein the one or more dominant interfering cells are selected from the interfering cells based on a respective average power of reference symbols, in the received signal, of the one or more interfering cells.

The method comprises simulating, for each of a plurality of signal-to-interference ratios, reception and demodulation of the received signal for a plurality of metric values to produce corresponding resulting error rates.

The method also comprises selecting, for each of the plurality of metric values, one or more parameter values of a pre-defined second function for mapping the first function of the signal-to-interference ratio to the channel condition indication such that a distance measure between the pre-defined second function and the simulation result is minimized, and populating the look-up table with the selected parameter values for each of the plurality of metric values.

The resulting error rates may, for example, comprise block error rates (BLER).

The pre-defined second function may, for example, comprise an integer part of a sum of a scaling factor multiplied by the first function of the signal-to-interference ratio of the received signal and an offset factor, wherein the one or more parameter values comprise at least one of the scaling factor and the offset factor.

Minimizing the distance measure may, for example, comprise performing a least square algorithm or a minimum mean square algorithm.

In a typical embodiment, a value of the scaling factor and/or the offset factor are chosen (for each metric value or each range of metric value) such that the resulting channel condition indication curve corresponds to a target resulting error rate of the simulation. The target resulting error rate may, for example, be 0.1 (10%).

In some embodiments, determining a channel condition indication according to the method of the first aspect may comprise addressing a look-up table created via the method of the second aspect with the metric value to obtain the one or more parameter values and using the one or more parameter values and the pre-defined second function for mapping the first function of the signal-to-interference ratio to the channel condition indication.

A third aspect is a computer program product comprising a computer readable medium, having thereon a computer program comprising program instructions, the computer program being loadable into a data-processing unit and adapted to cause execution of the method according to the first and/or second aspect when the computer program is run by the data-processing unit.

According to a fourth aspect, an arrangement is provided of a wireless communication device operating in connection with a cellular communication system providing a serving cell operated by a network node of the cellular communication system and one or more interfering cells.

The arrangement comprises a signal-to-interference calculator, a selector, an average power determiner, a metric calculator and a channel condition indication determiner.

The signal-to-interference calculator is adapted to calculate a first function of a signal-to-interference ratio of a received signal comprising symbols of the serving cell transmitted in a downlink channel and symbols of the one or more interfering cells.

The selector is adapted to select one or more of the interfering cells as dominant interfering cells based on a respective average power of reference symbols of the one or more interfering cells in the received signal.

The average power determiner is adapted to determine an average power of demodulated symbols of the serving cell in the received signal and a respective average power of demodulated symbols of each of the dominant interfering cells in the received signal.

The metric calculator is adapted to calculate a metric value based on the average power of demodulated symbols of the serving cell and on the respective average power of demodulated symbols of each of the dominant interfering cells.

The channel condition indication determiner is adapted to determine a channel condition indication based on the metric value and the first function of the signal-to-interference ratio of the received signal.

In some embodiments, the arrangement may further comprise a transceiver adapted to receive the received signal and to transmit the channel condition indication to the network node, thereby providing downlink channel condition information to a network node.

According to some embodiments, the channel condition indication determiner may comprise a look-up table for mapping the first function of the signal-to-interference ratio and the metric value to the channel condition indication. The look-up table may be created by the method according to the second aspect.

A fifth aspect is a wireless communication device comprising the arrangement of the fourth aspect.

In some embodiments, the fourth and fifth aspects may additionally have features identical with or corresponding to any of the various features as explained above for the first and/or second aspects.

An advantage of some embodiments is that more accurate determination of a channel condition indication is enabled. In some scenarios, this advantage may lead to higher throughput and/or closer compliance to a target error rate.

Another advantage of some embodiments is that the determination of the channel condition indication has low complexity and/or is easy to implement. In some scenarios, this advantage may be due to that the own cell geometry factor is readily available in association with the interference cancellation. Hence, very little functionality needs to be added to apply embodiments of the invention.

Some advantages are, typically, achieved by accounting for one or more dominating interfering cells in the determination of the channel condition indication.

Some advantages are, typically, achieved by accounting for the type of demodulator used for interference cancellation (or suppression) in the determination of the channel condition indication.

BRIEF DESCRIPTION OF THE DRAWINGS

Further objects, features and advantages will appear from the following detailed description of embodiments, with reference being made to the accompanying drawings, in which:

FIG. 1 is a flowchart illustrating example method steps according to some embodiments;

FIG. 2 is a flowchart illustrating example method steps according to some embodiments;

FIG. 3 is a block diagram illustrating an example arrangement according to some embodiments;

DETAILED DESCRIPTION

Figure 4:
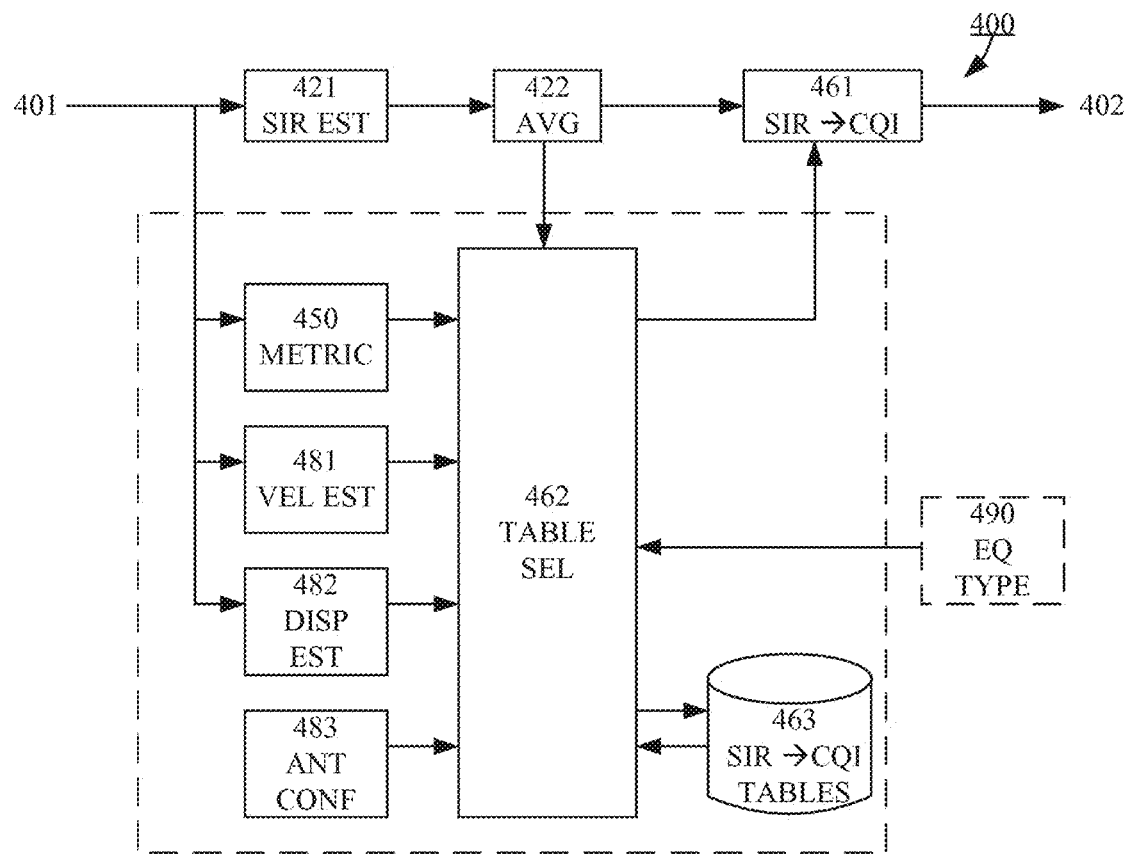
FIG. 4 is a block diagram illustrating an example arrangement according to some embodiments.

When referring herein to CQI and/or CSI this is done to exemplify a channel condition indication, and it is to be understood that any suitable channel condition indication may be used instead.

A wireless communication device may also be referred to herein as, simply, a device.

In the following, embodiments will be described where determination of channel condition indication (e.g. CQI or CSI) is based on the composition of the interference. For example, if there are one or more dominating interferers, a mapping from SIR to CQI or CSI reflects the composition of the interference according to some embodiments. The composition of the interference may also be seen as the "color" of the interference, e.g. how the interference is manifested in frequency, e.g. the power-frequency spectrum of colored interference is typically not a flat spectrum.

In some embodiment, the respective signal strength of a selected set of interfering cells is measured and, depending on the overall contribution to the interference of these cells, the CQI/CSI mapping is adjusted accordingly.

Embodiments may be especially useful for situations where a non-linear demodulator and/or interference canceller is applied in a wireless communication device. Using the demodulated symbols of each of the dominant interfering cells typically implies that the type of demodulator (e.g. equalizer) used by an interference canceller is accounted for in the determination of the channel condition indication (e.g. CQI or CSI). Thus determination of the channel condition indication may be based on a type of equalizer used by the wireless communication device.

For example, for a wireless communication device implementing interference cancellation (IC), a linear-receiver (i.e.

pre-IC) estimated signal strength measure (e.g. SIR, SINR, power, or similar) may be computed and an offset (or other adjustment) may be applied to account for an (average) post-IC signal strength measure improvement.

The adjustment may be determined based on an own cell geometry factor with regard to the device (e.g. a ratio of own cell Ior/Ioc to interfering/aggressor cell(s) Ior/Ioc, where Ior is the total transmitted power at the base station antenna and Ioc is the total noise power received at the antenna of the wireless device).

The geometry factor measures the power of the aggressor cell(s) (interference) signal compared to the power of the own cell (desired) signal. If the geometry factor is large, it typically is an indication that large benefits may be achieved by canceling the interfering signal. Hence, the geometry factor describes typical cancellation efficiency and enables prediction of the average signal strength measure gain of the interference cancellation.

In some embodiments, a metric value that reflects the amount of other cell interference is used in the mapping from signal-to-interference to CQI/CSI. For example, a CQI/CSI mapping table (e.g. implemented as a look-up table) may comprise an adjustment that is based on the metric value.

Application of some embodiments enables more accurate determination of a channel condition indication, which may lead to higher throughput and/or closer compliance to a target error rate. Typically, accounting for one or more dominating interfering cells and/or for the type of demodulator used for interference cancellation (or suppression) in the determination of the channel condition indication may lead to the increased accuracy.

Furthermore, implementation of some embodiments may have low complexity and/or be simple to accomplish. For example, the own cell geometry factor may be readily available in association with the interference cancellation and therefore very little functionality needs to be added.

FIG. 1 illustrates an example method 100 where CQI/CSI is determined based on a metric value, and FIG. 2 illustrates an example method 200 for adjustment of a CQI/CSI mapping table.

The method 100 of FIG. 1 may be performed by a wireless communication device operating in connection with a cellular communication system providing a serving cell operated by a network node of the cellular communication system and one or more interfering cells.

The method starts in step 110 where a signal is received. The signal comprises symbols of the serving cell transmitted in a downlink channel and symbols of the one or more interfering cells. In step 120, a first function, f(SIR), of a signal-to-interference ratio of the received signal is calculated. The first function may, for example, be an average SIR, a mutual information, or similar.

One or more of the interfering cells are selected as dominant interfering cells in step 130 based on a respective average power of reference symbols of the one or more interfering cells in the received signal. For example, the cell(s) with highest average power of reference symbols, or the cell(s) with average power of reference symbols above a threshold, may be selected.

An example, low complexity, method to measure the respective average power of reference symbols of the other/aggressor cell is to compute the Received Signal Code Power (RSCP) based on the CPICH for HSDPA and to compute the Reference Signal Received Power (RSRP) based on the CRS for UMTS-LTE. These measures typically model long term behavior of the total signal strength of the other cells quite well and may be used to select which cell(s) should be considered to be dominant interfering cells. RSCP could be computed based on $RSCP^n = \sum_{m=1}^{N_s} |\tilde{s}_{256,m}^{(n,0)}|^2 / N_s$, where $\tilde{s}_{256,m}^{(n,0)}$ denotes the estimated CPICH soft symbols with spreading factor 256 and channelization code 0, m is the symbol index, $N_s$ is the number of CPICH symbols considered for the RSCP computation, and n is the cell index (where n=0 is considered to be the serving cell).

An average power of demodulated symbols of the serving cell is determined in step 140 and respective average powers of demodulated symbols of each of the dominant interfering cells are determined in step 150.

A metric value is calculated in step 160 based on the average power of step 140 and on the respective average powers of step 150. The metric may, for example, be calculated as a ratio of the average power of step 140 to a sum of the respective average powers of step 150.

In non-linear receiver structures the other cell interference is typically demodulated before it is cancelled, and, thereafter, own cell demodulation is performed. Thus, the power of the transmitted signal (e.g. calculation over a transmission time interval—TTI—of the transmitted total power) from the other/interfering/aggressor cell is already available from the cancellation process. This measure is typically better than using only the pilot signals.

According to some examples, the power of an interfering cell n may be computed from estimated HS-PDSCH (High Speed Physical Downlink Shared CHannel) code symbols as $P^n = \sum_{l=0}^{15} \{\sum_{m=0}^{159} |\tilde{s}_{16,m}^{(n,l)}|^2 / 160\}$ where, $\tilde{s}_{16,m}^{(n,l)}$ denote the estimated HS-PDSCH soft symbols with spreading factor 16 and channelization code 1, m is the symbol index, 160 is the number of HS-PDSCH symbols per code per slot, and n is the cell index. An example metric value may be calculated as to $\log_{10}\{P^0 / \sum_{n=1}^{Q} P^n\}$, where n=0 is considered to be the serving cell and Q dominant interfering cells are considered.

In step 170, a channel condition indication (CQI/CSI) is determined based on the metric value and the first function of the signal-to-interference ratio of the received signal and the channel condition indication is transmitted (as a CQI/CSI report) to the network node in step 180, thereby providing downlink channel condition information to a network node.

Step 170 may comprise using a mapping table to map f(SIR) to a corresponding CQI/CSI value, wherein the mapping table is selected from a collection of mapping tables based on the metric value. The mapping table may implement the function CQI=floor($\alpha$SIR+$\beta$), or a corresponding function for CSI, where one or more of $\alpha$ and $\beta$ are functions of the metric value.

The method 200 of FIG. 2 may be performed in relation to a wireless communication device. The method 200 creates a look-up table for mapping a first function of a signal-to-interference ratio and a metric value to a channel condition indication, wherein the table is intended for use in a wireless communication device operating in connection with a cellular communication system providing a serving cell operated by a network node of the cellular communication system and one or more interfering cells. The first function of the signal-to-interference ratio is of a signal received by the wireless communication device and comprising symbols of the serving cell transmitted in a downlink channel and symbols of the one or more interfering cells and the metric value is calculated based on an average power of demodulated symbols, in the received signal, of the serving cell and on respective average power of demodulated symbols, in the received signal, of each of one or more dominant interfering cells, wherein the one or more dominant interfering cells are selected from the interfering cells based on a respective average power of reference symbols, in the received signal, of the one or more interfering cells. For example, the method 200 may be performed at a design or manufacturing phase of the device and the resulting look-up table may be loaded into a memory of the device. Alternatively or additionally, the resulting look-up table may be loaded into a memory of the device at a later phase, for example, in the form of an update of the device.

The device loaded with the look-up table resulting from the method 200 may be used to perform the method 100 of FIG. 1. Then, the determination step 170 may comprise using the look-up table.

For simplicity, the example method 200 will be explained in the context of HSDPA and mapping of SIR to CQI.

The example method 200 starts in step 210 where simulations of error rates (e.g. BLER) are performed for various SIR and various metric values. The example metric values described in connection with step 160 of FIG. 1 are applicable as examples in relation to step 210 of FIG. 2 as well.

For each of the plurality of metric values, one or more parameter values of a pre-defined second function for mapping the first function of the signal-to-interference ratio to the channel condition indication is selected in step 220. The (pre-defined) second function for mapping SIR to CQI is fitted to the simulation values. For each (or at least some) of the simulated metric values, one or more parameter values of the function are selected such that the distance measure (e.g. in least squares sense) between the second function and the simulation result is minimized.

Finally, the look-up table is populated (in step 230) with the selected parameter values (e.g. α and β values) for each of the plurality of metric values as determined in step 220.

Generally, the pre-defined second function of the CQI mapping for various dependent factors can be expressed as CQI=func{SIR, Doppler, channel dispersion, equalizer type, metric, etc}, but as seen above, a simpler approach is to use a straight line CQI=floor($\alpha$SIR+$\beta$), where $\alpha$ and $\beta$ may be functions of Doppler, channel dispersion, equalizer type, metric, etc.

In this example, the mapping function used in step 220 is CQI=floor($\alpha$SIR+$\beta$), where one or more of the parameters $\alpha$ and $\beta$ are variable based on the metric value. The value of the variable parameter(s) is selected (for each metric value or range of metric values) in step 220 such that the CQI of the mapping function corresponds to a target error rate of the simulation.

In some embodiments only $\beta$ is variable based on the metric value ($\mu$). Then $\alpha$ can be set to some static value, e.g. zero, for the purpose of creating the look-up table. The following table presents an example of how $\beta$ may be adjusted based on the metric value.

|  | $\mu <= -7$ | $\mu > -7$ |
|---|---|---|
| Low Dispersion Type3i equalizer | $\beta = -0.3000\mu - 13.8166$ | $\beta = -0.0600\mu - 12.2367$ |
| Low Dispersion OCIC equalizer | $\beta = -0.1833\mu - 13.5176$ | $\beta = -0.0267\mu - 12.4441$ |
| High Dispersion Type3i equalizer | $\beta = -0.1667\mu - 12.0463$ | $\beta = -0.1033\mu - 11.8520$ |
| High Dispersion OCIC equalizer | $\beta = -0.1833\mu - 13.2176$ | $\beta = -0.0267\mu - 12.1941$ |

A Type3i equalizer is a linear type of receiver structure in the terminology of 3GPP and an OCIC (other cell interference cancellation) equalizer is a receiver structure wherein (at least some of the) interference from other cells is cancelled.

In the above example table, the possible metric values ($\mu$) are organized in two groups (whether larger than −7 or not) and the value of 0 is determined based on the type of equalizer, the amount of dispersion, and the group of the metric value.

In this example, the two groups of the metric value represent using two different straight lines in the fitting process of step 220.

If there are two dominant interfering cells their metrics may map as a two-dimensional coordinate to a corresponding offset value in some embodiments.

In other embodiments, the ratio of the larger of the two metrics to the smaller of the two metrics may be used to map to a certain table of offsets, and the final offset may be determined by looking up the table entry corresponding to the larger of the metrics.

FIG. 3 illustrates an example arrangement 300 for a wireless communication device operating in connection with a cellular communication system providing a serving cell operated by a network node of the cellular communication system and one or more interfering cells. The example arrangement may, for example, be adapted to perform method steps as described in connection with the method 100 of FIG. 1.

The arrangement 300 comprises a signal-to-interference calculator (SIR CALC) 320, a selector (SEL) 330, an average power determiner (POW AVG) 340, a metric calculator (MET CALC) 350 and a channel condition indication determiner (CCID) 360. The arrangement is also associated with a transceiver 310 (TX/RX) which may or may not be comprised in the arrangement.

The transceiver 310 is adapted to receive a signal comprising symbols of the serving cell transmitted in a downlink channel and symbols of the one or more interfering cells (compare with step 110 of FIG. 1) and to transmit a channel condition indication to the network node (compare with step 180 of FIG. 1).

The signal-to-interference calculator 320 is adapted to calculate a first function of a signal-to-interference ratio of the signal received by the transceiver (compare with step 120 of FIG. 1), and the selector 330 is adapted to select one or more of the interfering cells as dominant interfering cells based on a respective average power of reference symbols of the one or more interfering cells in the received signal (compare with step 130 of FIG. 1).

The average power determiner 340 is adapted to determine, from the received signal, an average power of demodulated symbols of the serving cell and a respective average power of demodulated symbols of each of the dominant interfering cells selected by the selector (compare with steps 140 and 150 of FIG. 1).

The metric calculator 350 is adapted to calculate a metric value based on the average powers of the average power determiner (compare with step 160 of FIG. 1).

The channel condition indication determiner 360 is adapted to determine a channel condition indication based on the metric value of the metric calculator and the first function of the signal-to-interference calculator (compare with step 170 of FIG. 1), which channel condition indication is forwarded to the transceiver 310 for transmission to the network node.

The channel condition indication determiner 360 may comprise a look-up table (LUT) 370 for mapping the first function of the signal-to-interference ratio and the metric value to the channel condition indication. The look-up table may, for example, be created via an arrangement adapted to perform the method of FIG. 2.

FIG. 4 illustrate an example arrangement 400 for CQI determination. A received signal 401 is input to a SIR estimator (SIR EST) 421 which inputs an estimated SIR to an averaging unit (AVG) 422 for averaging over slots (compare with 320 of FIG. 3).

The received signal is also input to a metric calculation unit (METRIC) 450 (compare with 330, 340, 350 of FIG. 3) for calculation of a metric value as exemplified above. The metric value is input to a mapping table selection unit (TABLE SEL) 462 along with a velocity estimate produced by a velocity estimation unit (VEL EST) 481, a path dispersion estimate produced by a path dispersion estimation unit (DISP EST) 482, and received information regarding antenna configuration from an antenna configuration block (ANT CONF) 483. The type of equalizer used (EQ TYPE) 490 may also be directly input to the mapping table selection unit 462.

The mapping table selection unit 462 selects a SIR to CQI mapping table from a database 463 based, at least, on the metric value and forwards the selection to the SIR to CQI mapping unit 461 which outputs a CQI value 402 based on the averaged SIR from the averaging unit 422 and the selected mapping table. The mapping table selection unit 462, the database 463 and the SIR to CQI mapping unit 461 may be compared with 360 of FIG. 3.

In some embodiments, the selection input to the CQI mapping unit 461 comprises values of $\alpha$ and $\beta$ and the CQI mapping unit 461 implements the second function as CQI=floor($\alpha$SIR+$\beta$).

The described embodiments and their equivalents may be realized in software or hardware or a combination thereof. They may be performed by general-purpose circuits associated with or integral to a communication device, such as digital signal processors (DSP), central processing units (CPU), co-processor units, field-programmable gate arrays (FPGA) or other programmable hardware, or by specialized circuits such as for example application-specific integrated circuits (ASIC). All such forms are contemplated to be within the scope of this disclosure.

Embodiments may appear within an electronic apparatus (such as a wireless communication device) comprising circuitry/logic or performing methods according to any of the embodiments. The electronic apparatus may, for example, be a portable or handheld mobile radio communication equipment, a user equipment, a mobile radio terminal, a mobile telephone, a communicator, an electronic organizer, a smartphone, a computer, a notebook, a USB-stick, a plug-in card, an embedded drive, or a mobile gaming device.

Figure 5:
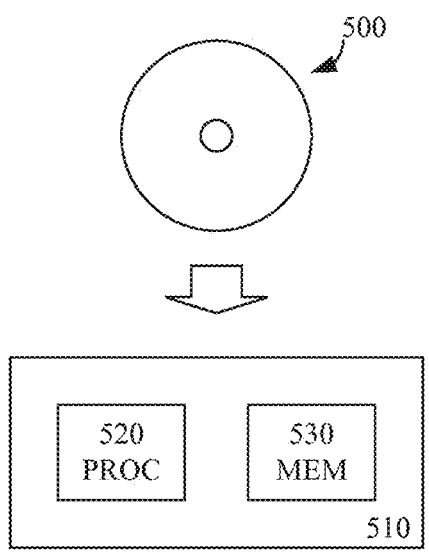
FIG. 5 is a schematic drawing illustrating an example computer readable medium according to some embodiments.

According to some embodiments, a computer program product comprises a computer readable medium such as, for example, a diskette or a CD-ROM as illustrated by 500 of FIG. 5. The computer readable medium may have stored thereon a computer program comprising program instructions. The computer program may be loadable into a data-processing unit 520, which may, for example, be comprised in a mobile terminal 510. When loaded into the data-processing unit 520, the computer program may be stored in a memory 530 associated with or integral to the data-processing unit 520. According to some embodiments, the computer program may, when loaded into and run by the data-processing unit, cause the data-processing unit to execute method steps according to, for example, the methods shown in any of the FIGS. 1 and 2.

Reference has been made herein to various embodiments. However, a person skilled in the art would recognize numerous variations to the described embodiments that would still fall within the scope of the claims. For example, the method embodiments described herein describes example methods through method steps being performed in a certain order. However, it is recognized that these sequences of events may take place in another order without departing from the scope of the claims. Furthermore, some method steps may be performed in parallel even though they have been described as being performed in sequence.

In the same manner, it should be noted that in the description of embodiments, the partition of functional blocks into particular units is by no means limiting. Contrarily, these partitions are merely examples. Functional blocks described herein as one unit may be split into two or more units. In the same manner, functional blocks that are described herein as being implemented as two or more units may be implemented as a single unit without departing from the scope of the claims.

Hence, it should be understood that the details of the described embodiments are merely for illustrative purpose and by no means limiting. Instead, all variations that fall within the range of the claims are intended to be embraced therein.

In conclusion, the following list represents a few illustrative example embodiments:

1. A method of a wireless communication device operating in connection with a cellular communication system providing a serving cell operated by a network node of the cellular communication system and one or more interfering cells, the method comprising receiving a signal comprising symbols of the serving cell transmitted in a downlink channel and symbols of the one or more interfering cells, calculating a first function of a signal-to-interference ratio of the received signal, selecting one or more of the interfering cells as dominant interfering cells based on a respective average power of reference symbols of the one or more interfering cells in the received signal, determining an average power of demodulated symbols of the serving cell in the received signal, determining a respective average power of demodulated symbols of each of the dominant interfering cells in the received signal, calculating a metric value based on the average power of demodulated symbols of the serving cell and on the respective average power of demodulated symbols of each of the dominant interfering cells, determining a channel condition indication based on the metric value and the first function of the signal-to-interference ratio of the received signal, and transmitting the channel condition indication to the network node, thereby providing downlink channel condition information to a network node.

2. The method of example 1 wherein the metric is calculated as a ratio of the average power of demodulated symbols of the serving cell to a sum of the respective average powers of demodulated symbols of each of the dominant interfering cells.

3. The method of any of examples 1 through 2 wherein determining a channel condition indication is further based on a type of equalizer used by the wireless communication device.

4. The method of any of examples 1 through 3 wherein the channel condition indication is a channel quality indicator—CQI—value or a channel state information—CSI—value.

5. The method of example 3 wherein the channel condition indication is a channel quality indicator—CQI—value and wherein determining a channel condition indication comprises calculating an integer part of a sum of a scaling factor multiplied by the first function of the signal-to-interference ratio of the received signal and an offset factor, and wherein at least one of the scaling factor and the offset factor depends on the metric value.

6. The method of example 3 wherein the channel condition indication is a channel state information—CSI—value and wherein determining a channel condition indication comprises calculating a sum over a plurality of resource blocks of an integer part of a logarithm of a sum of a scaling factor multiplied by the first function of the signal-to-interference ratio of the received signal and an offset factor, and wherein at least one of the scaling factor and the offset factor depends on the metric value.

7. A method of creating a look-up table for mapping a first function of a signal-to-interference ratio and a metric value to a channel condition indication, wherein the table is intended for use in a wireless communication device operating in connection with a cellular communication system providing a serving cell operated by a network node of the cellular communication system and one or more interfering cells, and wherein the first function of the signal-to-interference ratio is of a signal received by the wireless communication device and comprising symbols of the serving cell transmitted in a downlink channel and symbols of the one or more interfering cells, and the metric value is calculated based on an average power of demodulated symbols, in the received signal, of the serving cell and on respective average power of demodulated symbols, in the received signal, of each of one or more dominant interfering cells, wherein the one or more dominant interfering cells are selected from the interfering cells based on a respective average power of reference symbols, in the received signal, of the one or more interfering cells. The method comprises simulating, for each of a plurality of signal-to-interference ratios, reception and demodulation of the received signal for a plurality of metric values to produce corresponding resulting error rates, selecting, for each of the plurality of metric values, one or more parameter values of a pre-defined second function for mapping the first function of the signal-to-interference ratio to the channel condition indication such that a distance measure between the pre-defined second function and the simulation result is minimized, and populating the look-up table with the selected parameter values for each of the plurality of metric values.

8. The method of any of examples 1 through 6 wherein determining a channel condition indication comprises addressing a look-up table created via the method of example 6 with the metric value to obtain the one or more parameter values, and using the one or more parameter values and the pre-defined second function for mapping the first function of the signal-to-interference ratio to the channel condition indication.

9. A computer program product comprising a computer readable medium, having thereon a computer program comprising program instructions, the computer program being loadable into a data-processing unit and adapted to cause execution of the method according to any of examples 1 through 8 when the computer program is run by the data-processing unit.

10. An arrangement of a wireless communication device operating in connection with a cellular communication system providing a serving cell operated by a network node of the cellular communication system and one or more interfering cells, the arrangement comprising a signal-to-interference calculator adapted to calculate a first function of a signal-to-interference ratio of a received signal comprising symbols of the serving cell transmitted in a downlink channel and symbols of the one or more interfering cells, a selector adapted to select one or more of the interfering cells as dominant interfering cells based on a respective average power of reference symbols of the one or more interfering cells in the received signal, an average power determiner adapted to determine an average power of demodulated symbols of the serving cell in the received signal and a respective average power of demodulated symbols of each of the dominant interfering cells in the received signal, a metric calculator adapted to calculate a metric value based on the average power of demodulated symbols of the serving cell and on the respective average power of demodulated symbols of each of the dominant interfering cells, and a channel condition indication determiner adapted to determine a channel condition indication based on the metric value and the first function of the signal-to-interference ratio of the received signal.

11. The arrangement of example 10 further comprising a transceiver adapted to receive the received signal and to transmit the channel condition indication to the network node, thereby providing downlink channel condition information to a network node.

12. The arrangement of any of examples 10 through 11 wherein the channel condition indication determiner comprises a look-up table for mapping the first function of the signal-to-interference ratio and the metric value to the channel condition indication, the look-up table created by simulation, for each of a plurality of signal-to-interference ratios, of reception and demodulation of the received signal for a plurality of metric values to produce corresponding error rates, wherein each error rate corresponds to a value of the channel condition indication, selection, for each of the plurality of metric values, of one or more parameter values of a pre-defined second function for mapping the first function of the signal-to-interference ratio to the channel condition indication such that a distance measure between the pre-defined second function and the simulation is minimized, and population of the look-up table with the selected parameter values for each of the plurality of metric values.

13. A wireless communication device comprising the arrangement of any of examples 10 through 12.

The invention claimed is:
1. A method of a wireless communication device operating in connection with a cellular communication system providing a serving cell operated by a network node of the cellular communication system and one or more interfering cells, the method comprising:
receiving a signal comprising symbols of the serving cell transmitted in a downlink channel and symbols of the one or more interfering cells;
calculating a first function of a signal-to-interference ratio of the received signal;

selecting one or more of the interfering cells as dominant interfering cells based on a respective average power of reference symbols of the one or more interfering cells in the received signal;

determining an average power of demodulated symbols of the serving cell in the received signal;

determining a respective average power of demodulated symbols of each of the dominant interfering cells in the received signal;

calculating a metric value based on the average power of demodulated symbols of the serving cell and on the respective average power of demodulated symbols of each of the dominant interfering cells;

determining a channel condition indication based on the metric value and the first function of the signal-to-interference ratio of the received signal; and transmitting the channel condition indication to the network node, thereby providing downlink channel condition information to a network node.

2. The method of claim 1, wherein the metric is calculated as a ratio of the average power of demodulated symbols of the serving cell to a sum of the respective average powers of demodulated symbols of each of the dominant interfering cells.

3. The method of claim 1, wherein determining a channel condition indication is further based on a type of equalizer used by the wireless communication device.

4. The method of claim 1, wherein the channel condition indication is a channel quality indicator (CQI) value or a channel state information (CSI) value.

5. The method of claim 4, wherein the channel condition indication is a CQI value and wherein determining a channel condition indication comprises calculating an integer part of a sum of a scaling factor multiplied by the first function of the signal-to-interference ratio of the received signal and an offset factor, and wherein at least one of the scaling factor and the offset factor depends on the metric value.

6. The method of claim 4, wherein the channel condition indication is a CSI value and wherein determining a channel condition indication comprises calculating a sum over a plurality of resource blocks of an integer part of a logarithm of a sum of a scaling factor multiplied by the first function of the signal-to-interference ratio of the received signal and an offset factor, and wherein at least one of the scaling factor and the offset factor depends on the metric value.

7. A non-transitory computer-readable medium comprising, stored thereupon, a computer program comprising program instructions, the computer program being loadable into a data-processing unit of a wireless communication device and configured to cause, when the computer program is run by the data-processing unit, the wireless communication device to, when operating in connection with a cellular communication system providing a serving cell operated by a network node of the cellular communication system and one or more interfering cells:

receive a signal comprising symbols of the serving cell transmitted in a downlink channel and symbols of the one or more interfering cells;

calculate a first function of a signal-to-interference ratio of the received signal;

select one or more of the interfering cells as dominant interfering cells based on a respective average power of reference symbols of the one or more interfering cells in the received signal;

determine an average power of demodulated symbols of the serving cell in the received signal;

determine a respective average power of demodulated symbols of each of the dominant interfering cells in the received signal;

calculate a metric value based on the average power of demodulated symbols of the serving cell and on the respective average power of demodulated symbols of each of the dominant interfering cells;

determine a channel condition indication based on the metric value and the first function of the signal-to-interference ratio of the received signal; and transmit the channel condition indication to the network node, thereby providing downlink channel condition information to a network node.

8. An arrangement of a wireless communication device operating in connection with a cellular communication system providing a serving cell operated by a network node of the cellular communication system and one or more interfering cells, the arrangement comprising:

programmable hardware or one or more application-specific integrated circuits, or a combination thereof, configured to calculate a first function of a signal-to-interference ratio of a received signal comprising symbols of the serving cell transmitted in a downlink channel and symbols of the one or more interfering cells;

select one or more of the interfering cells as dominant interfering cells based on a respective average power of reference symbols of the one or more interfering cells in the received signal;

determine an average power of demodulated symbols of the serving cell in the received signal and a respective average power of demodulated symbols of each of the dominant interfering cells in the received signal;

calculate a metric value based on the average power of demodulated symbols of the serving cell and on the respective average power of demodulated symbols of each of the dominant interfering cells; and determine a channel condition indication based on the metric value and the first function of the signal-to-interference ratio of the received signal.

9. The arrangement of claim 8, further comprising a transceiver adapted to receive the received signal and to transmit the channel condition indication to the network node, thereby providing downlink channel condition information to a network node.

10. The arrangement of claim 8, wherein the arraignment is configured to determine the channel condition indication by using a look-up table for mapping the first function of the signal-to-interference ratio and the metric value to the channel condition indication, the look-up table created by:

simulation, for each of a plurality of signal-to-interference ratios, of reception and demodulation of the received signal for a plurality of metric values to produce corresponding error rates, wherein each error rate corresponds to a value of the channel condition indication;

selection, for each of the plurality of metric values, of one or more parameter values of a pre-defined second function for mapping the first function of the signal-to-interference ratio to the channel condition indication such that a distance measure between the pre-defined second function and the simulation is minimized; and population of the look-up table with the selected parameter values for each of the plurality of metric values.

11. A wireless communication device comprising the arrangement of claim 8.

\* \* \* \* \*